US006813522B1

(12) United States Patent
Schwarm et al.

(10) Patent No.: US 6,813,522 B1
(45) Date of Patent: Nov. 2, 2004

(54) METHOD OF SHARING MEMORY IN A MULTI-PROCESSOR SYSTEM INCLUDING A CLONING OF CODE AND DATA

(75) Inventors: Stephen C. Schwarm, Wrentham, MA (US); Dar Efroni, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 722 days.

(21) Appl. No.: 09/752,176

(22) Filed: Dec. 29, 2000

(51) Int. Cl.[7] .................. G06F 15/177; G06F 12/14
(52) U.S. Cl. ................ 700/5; 713/1; 713/2; 711/153; 711/155; 711/206; 711/166
(58) Field of Search ............... 700/5; 711/153, 711/155, 207, 206; 713/1, 2

(56) References Cited

U.S. PATENT DOCUMENTS

| | | | | |
|---|---|---|---|---|
| 4,445,174 A | * | 4/1984 | Fletcher | 711/121 |
| 4,691,280 A | * | 9/1987 | Bennett | 710/305 |
| 5,737,605 A | * | 4/1998 | Cunningham et al. | 719/312 |
| 5,892,915 A | | 4/1999 | Duso et al. | 395/200.49 |
| 5,938,765 A | * | 8/1999 | Dove et al. | 713/1 |
| 5,944,789 A | | 8/1999 | Tzelnic et al. | 709/214 |
| 6,003,123 A | * | 12/1999 | Carter et al. | 711/207 |
| 6,112,286 A | * | 8/2000 | Schimmel et al. | 711/208 |
| 6,182,089 B1 | * | 1/2001 | Ganapathy et al. | 707/206 |
| 6,240,501 B1 | * | 5/2001 | Hagersten | 711/202 |
| 6,314,501 B1 | * | 11/2001 | Gulick et al. | 711/153 |
| 6,314,515 B1 | * | 11/2001 | Miller et al. | 713/1 |
| 6,381,682 B2 | * | 4/2002 | Noel et al. | 711/153 |
| 6,430,667 B1 | * | 8/2002 | Loen | 711/202 |
| 6,594,735 B1 | * | 7/2003 | Newell et al. | 711/147 |
| 6,604,182 B1 | * | 8/2003 | Sexton et al. | 711/170 |

OTHER PUBLICATIONS

Jesse Liberty, "Sams Teach Yourself C++ in 21 Days—Third Edition," Sams Publishing, A Division of Macmillan Computer Publishing, Indianapolis, IN, 1999, pp. 127–147.
"MultiProcessor Specification Version 1.4," May 1997, Intel Corporation, Mt. Prospect, IL, 1993–1997, 97 pages.
"Pentium® Processor Family Developer's Manual, vol. 3: Architecture and Programming Manual," Intel Corporation, Mt. Prospect, IL, 1995, 71 pages.
Helen S. Raizen and Stephen C. Schwarm, "Building a Semi–Loosely Coupled Multiprocessor System Based on Network Process Extension," Prime Computer, Inc., Framingham, MA, Pre–Publication Copy, Jan. 29, 1991, pp. 1–17.

* cited by examiner

Primary Examiner—John Follansbee
Assistant Examiner—Aaron Perez-Daple
(74) Attorney, Agent, or Firm—Novak Druce LLP; Richard Auchterlonie

(57) ABSTRACT

Code and data are cloned in a multiprocessor system in order to permit each processor to run concurrently a separate invocation of a program. Each processor uses the same address translation for shared access to the program code in a shared memory, and a different address translation for access to a respective private read-write data region in the shared memory. Initialization of a private data region is performed by copying data from a shared read-only memory region, such as the program region, to the private data region. Some static constructors may access a shared read-write data area that should not be reinitialized by the clone processor. In this case, a working copy of a data region is made, the address translation is remapped for access to the working copy, the static constructors are run, and then the mapping is returned for normal access to the shared data.

24 Claims, 6 Drawing Sheets

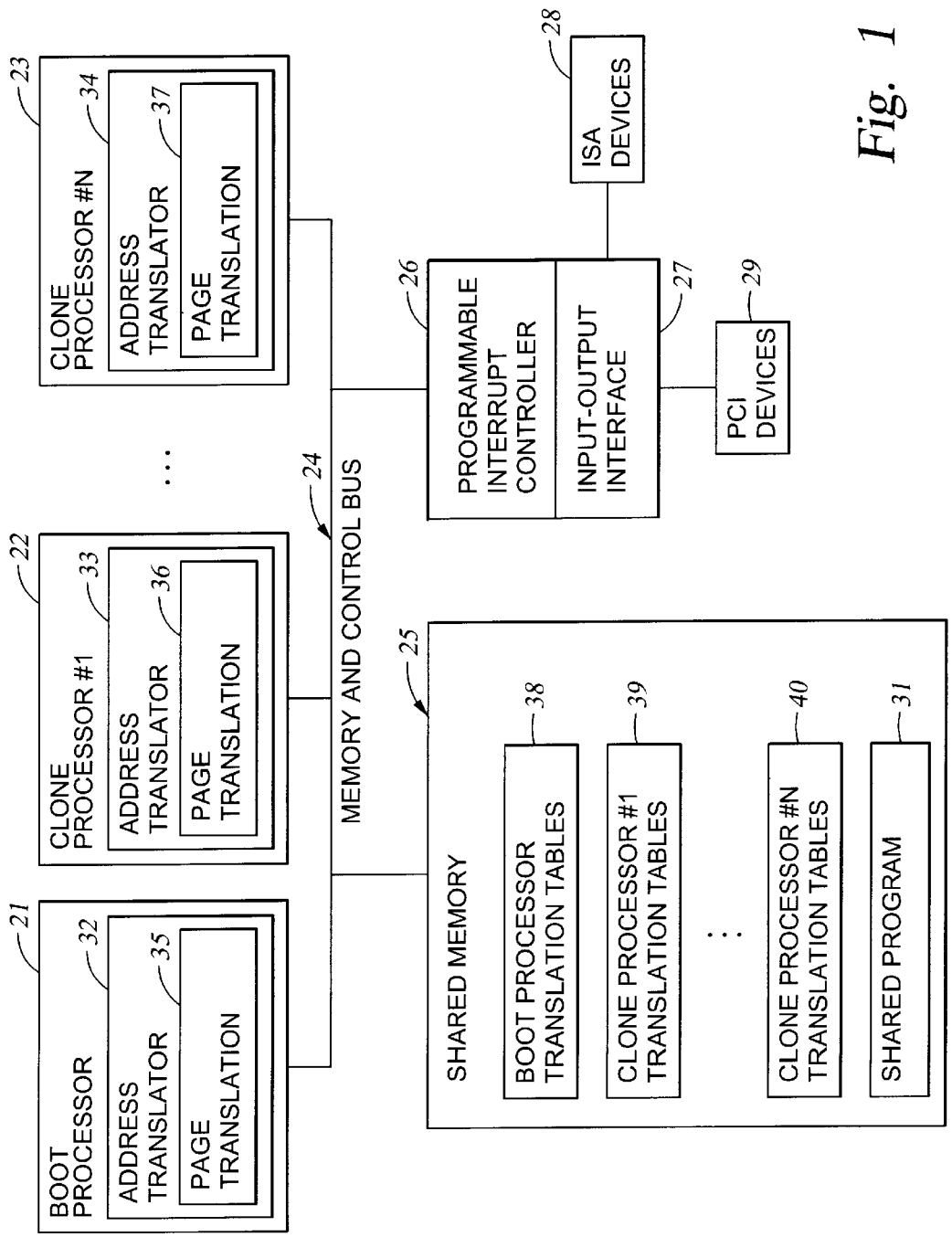

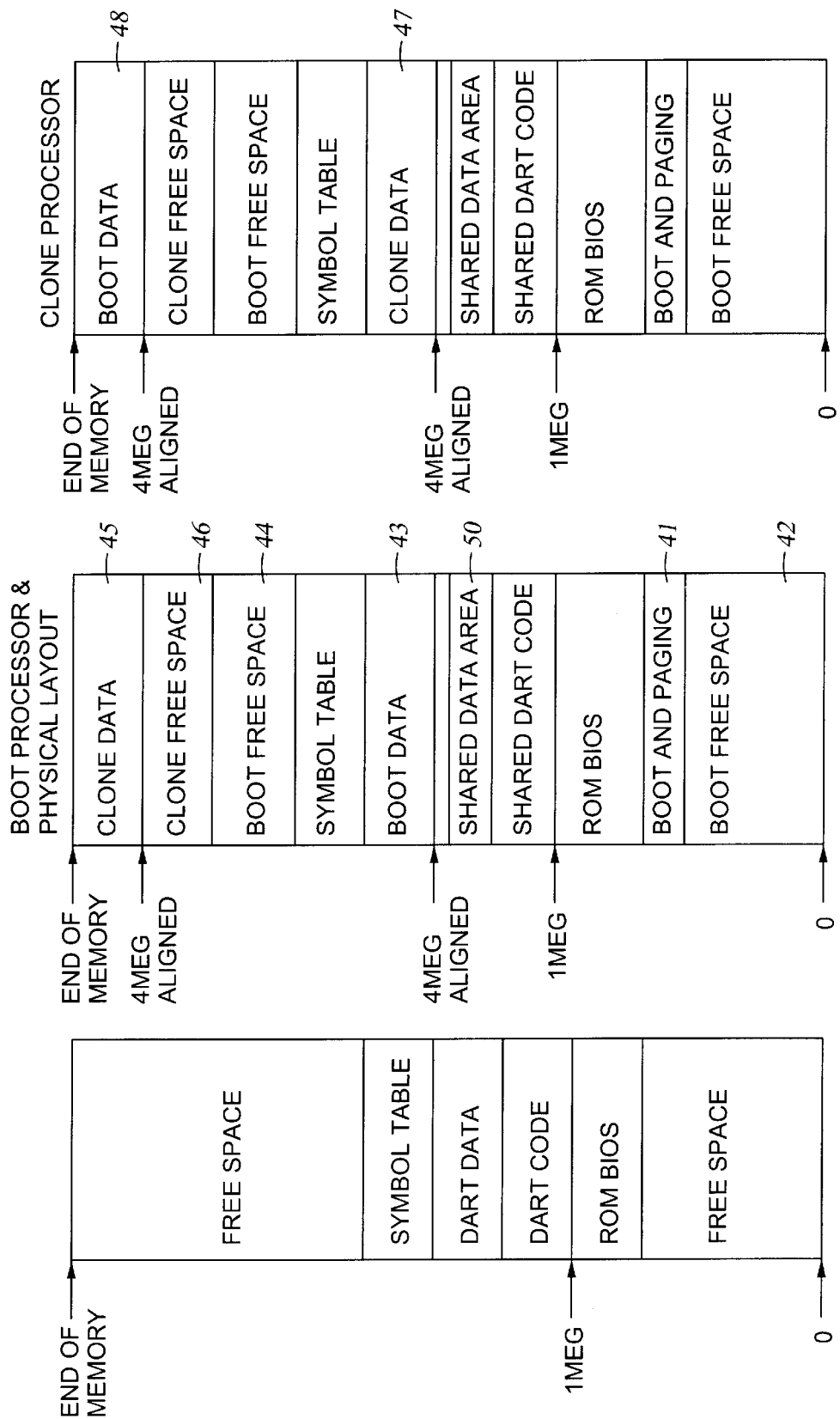

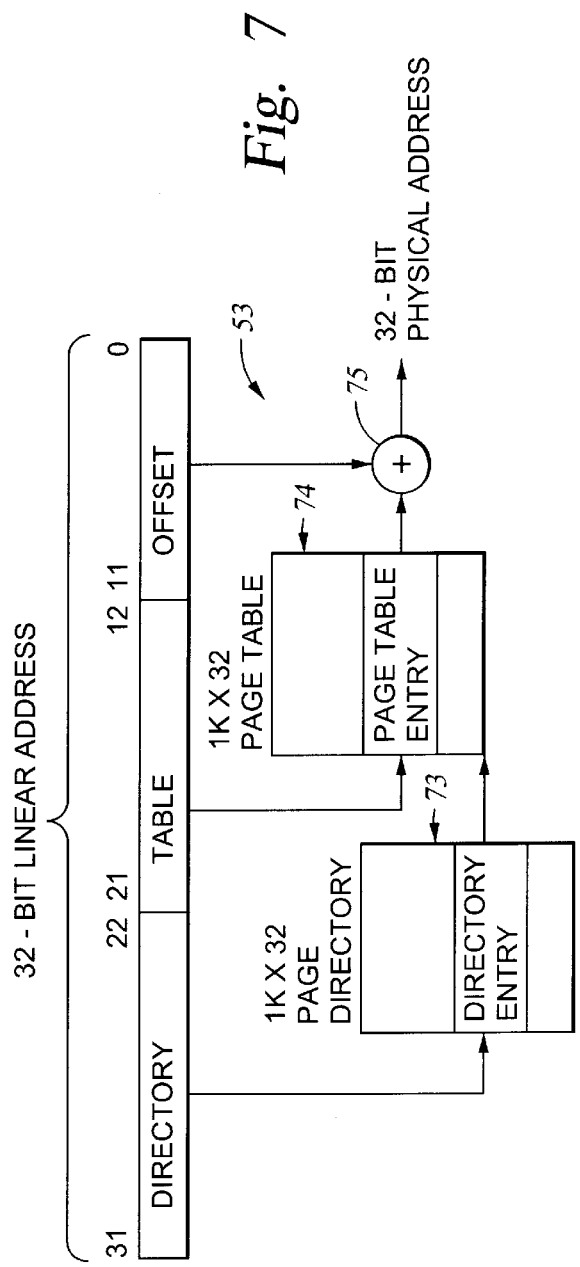
Fig. 7
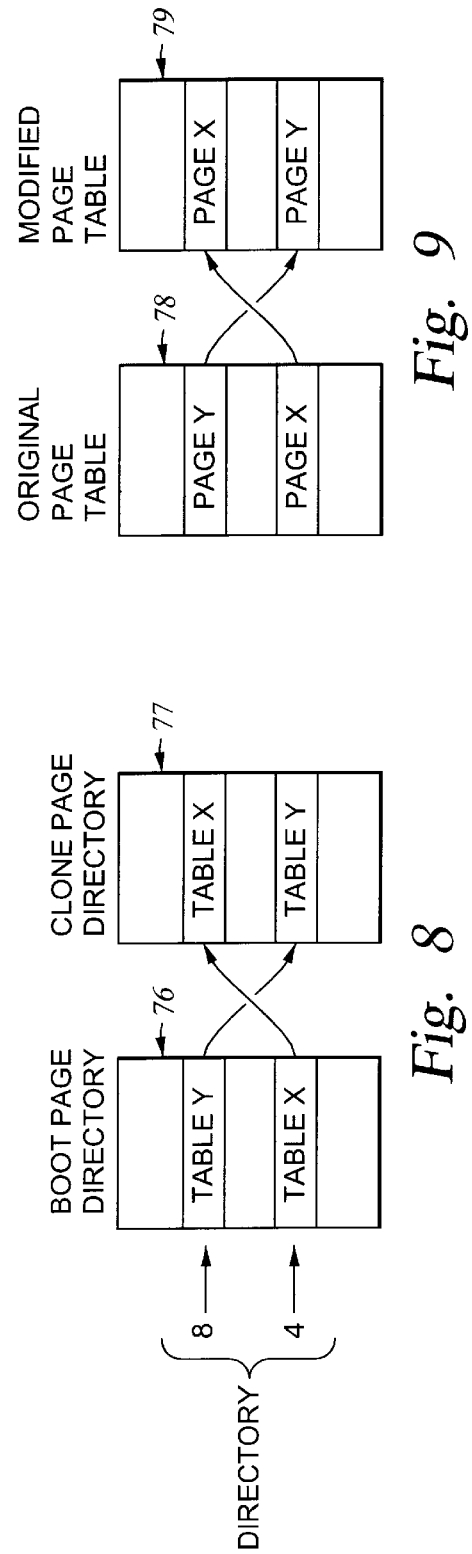
Fig. 9
Fig. 8

METHOD OF SHARING MEMORY IN A MULTI-PROCESSOR SYSTEM INCLUDING A CLONING OF CODE AND DATA

BACKGROUND OF THE INVENTION

1. Field of the Invention

The present invention relates to programming of a multiprocessor system in order to support concurrent invocations of a program on respective processors in the system.

2. Background Art

With the advent of cache memory, there has been an advantage to coupling multiple processors to a shared memory for general-purpose applications. By providing a dedicated cache memory for each processor, each processor can operate at nearly 100% of the time by accessing cache memory most of the time and accessing the shared memory during a small percentage of the time. The shared memory can also be used for communication between the processors.

Since the introduction of the Intel PENTIUM (Trademark) microprocessor, the caches and memory management circuitry have been integrated onto commodity processor chips together with special machine instructions to facilitate the construction of multiprocessor systems. More recently, the cost of these commodity processor chips has dropped relative to the cost of other computer system components so that general-purpose systems using commodity processors can be expanded at reasonable incremental cost by substituting multiple processor circuit boards where single processor circuit boards were previously used. Memory management and initialization techniques for the Intel Pentium® microprocessor, including a programming example of switching from a real-dress mode to a protected address mode, are further described in the Intel Pentium® Processor Family Developer's Manual, Vol. 3: Architecture and Programming Manual, 1995, pp. 11-1 to 11-25, 14-1 to 14-13, and 16-1 to 16-31.

One application for a multiprocessor system is a network server. A conventional operating system for a network server is the Unix system. The problem of converting the Unix system for execution on a multiprocessor architecture is discussed in H. S. Raizen and S. C. Schwarm, "Building a Semi-Loosely Coupled Multiprocessor System Based on Network Process Extension," 1991 USENIX Symposium on Experiences with Distributed and Multiprocessor Systems. Operating system functions previously restricted to a single processor (such as shared memory, semaphores, message queues and symbolic links) need to be made safe for access by multiple processors. This normally involves the use of special instructions in the processor, such as the xchg instruction on the Intel Pentiumg Processor Family. These special instructions have a significant detrimental impact on the system performance. The detrimental impact is increased as more processors are added to the system.

SUMMARY OF THE INVENTION

In accordance with one aspect of the present invention, there is provided a method of operating a multiprocessor system. The multiprocessor system includes at least a first processor, a second processor, and a memory linked to each of the processors for read and write access to the memory by each of the processors. Each of the processors has an address translator for translating logical addresses specified by program instructions to corresponding physical addresses for addressing the memory. The address translator of the first processor accesses a first translation table, and the address translator of the second processor accesses a second translation table. The method includes allocating at least three non-overlapping regions in physical address space of the memory including a program region containing a program, a first data region for private read-write access by the first processor, and a second data region for private read-write access by the second processor. The method further includes initializing a first copy of program data in the first data region of the memory, and initializing a second copy of the program data in the second data region of the memory. The method further includes setting entries in the first translation table and in the second translation table so that each of the processors translates logical instruction addresses of program instructions of the program in the memory to physical addresses of the program instructions in the program region of the memory so that the processors share read-only access to the program in the memory during concurrent invocations of the program in the memory, so that the first processor translates logical data addresses specified by read-write access instructions in the program to physical addresses in the first data region of the memory, and so that the second processor translates the logical data addresses specified by the read-write access instructions in the program to physical addresses in the second data region of the memory. Moreover, the method includes each of the processors running concurrently a separate invocation of the program in the program region of the memory. Therefore, each of the processors can concurrently run a separate invocation of the program in a multiprocessor safe fashion without a substantial need for executing special multiprocessor instructions.

In accordance with another aspect, the invention provides a method of accessing a memory in a multiprocessor system including at least a first processor, and a second processor. The memory is linked to each of the processors for read and write access to the memory by each of the processors. Each of the processors has an address translator for translating logical addresses specified by program instructions to corresponding physical addresses for addressing the memory. The memory is accessed so that each of the processors may run concurrently a separate invocation of a program in a program region of the memory while accessing a shared data area in the memory. When using object oriented languages like C++, the startup of the program includes execution of a set of data initialization routines call constructors. These constructors would destroy the current state of the shared memory area if they were allowed to modify it during the startup of the second processor. Therefore, the method further includes copying shared data from the shared data area of the memory to a free area of the memory, the shared data area of the memory being referenced by constructors, changing address translation of the second processor from a first state to a second state so that the constructors reference the copy of the shared data, running the constructors so that the constructors access the copy of the shared data; and then returning the address translation of the second processor to the first state.

In accordance with yet another aspect, the invention provides a multiprocessor system comprising at least a first processor, a second processor, and a memory linked to each of the processors for read and write access to the memory by each of the processors. Each of the processors has an address translator for translating logical addresses specified by program instructions to corresponding physical addresses for addressing the memory. The address translator of the first processor is operative for accessing a first translation table, and the address translator of the second processor is operative for accessing a second translation table. The processors are programmed for allocating at least three non-overlapping regions in physical address space of the memory including a program region containing a program, a first data region for private read-write access by the first processor, and a second data region for private read-write access by the second processor. The processors are also programmed for initializing a first copy of program data in the first data region of the memory, and initializing a second copy of the program data in the second data region of the memory. The processors are also programmed for setting entries in the first translation table and in the second translation table so that each of the processors translates logical instruction addresses of program instructions of the program in the memory to physical addresses of the program instructions in the program region of the memory so that the processors share read-only access to the program in the memory during concurrent invocations of the program in the memory, so that the first processor translates logical data addresses specified by read-write access instructions in the program to physical addresses in the first data region of the memory, and so that the second processor translates the logical data addresses specified by the read-write access instructions in the program to physical addresses in the second data region of the memory. Moreover, the processors are programmed for each of the processors running concurrently a separate invocation of the program in the program region of the memory. Therefore, each of the processors can concurrently run a separate invocation of the program in a multiprocessor safe fashion without a substantial need for executing special multiprocessor instructions.

In accordance with still another aspect, the invention provides a multiprocessor system including at least a first processor, a second processor, and a memory linked to each of the processors for read and write access to the memory by each of the processors. Each of the processors has an address translator for translating logical addresses specified by program instructions to corresponding physical addresses for addressing the memory. Each of the processors is programmed for concurrently running a separate invocation of a program in a program region of the memory and accessing a shared data area in the memory. When using object oriented languages like C++, the startup of the program includes execution of a set of data initialization routines call constructors. These constructors would destroy the current state of the shared memory area if they were allowed to modify it during the startup of the second processor. Therefore, the second processor is further programmed for copying shared data from the shared data area of the memory to a free area of the memory that is referenced by constructors, changing address translation of the second processor from a first state to a second state so that the constructors reference the copy of the shared data, running the constructors so that the constructors access the copy of the shared data, and then returning the address translation of the second processor to the first state.

BRIEF DESCRIPTION OF THE DRAWINGS

Other objects and advantages of the invention will become apparent upon reading the following detailed description with reference to the drawings, in which:

FIG. 1 is a block diagram of a multiprocessor system incorporating the present invention;

FIG. 2 is a memory layout for a prior art uniprocessor system;

FIG. 3 is a layout of the shared memory in the multiprocessor system of FIG. 1 when the system contains one boot processor and one clone processor;

FIG. 4 is a layout of the shared memory as seen by the clone processors in the multiprocessing system of FIG. 1 when the system contains one boot processor and one clone processor;

FIG. 7 is a block diagram of paging circuitry in the Pentium) processor;

FIG. 8 is a block diagram showing how entries in a page directory can be exchanged in order to perform a re-mapping of a pair of 4 megabyte memory regions;

FIG. 9 is a block diagram showing how entries in a page table can be exchanged in order to perform a re-mapping of a pair of 4 kilobyte pages;

Figure 5:
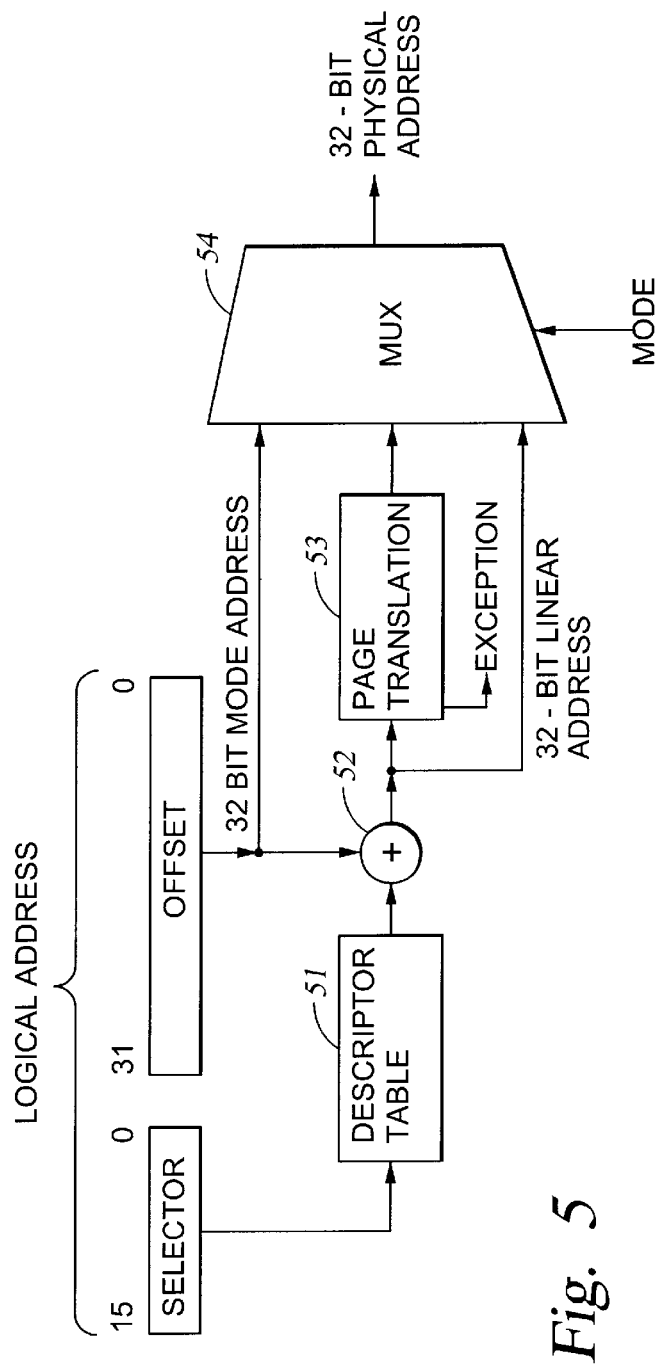
FIG. 5 is a block diagram of address translation circuitry in the Pentiumg processor.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1 of the drawings, there is shown a block diagram of a multiprocessor system incorporating the present invention. The system includes a boot processor 21 and one or more clone processors 22, 23. In this example, the boot processor 21 is functionally identical to the clone processors 22, 23. However, the boot processor 21 is responsible for initiating the system and for booting operating system routines. The clone processors are activated after the boot processor, as will be further described below with reference to FIG. 6. If the system of FIG. 1 were to be compliant with the Intel MultiProcessor Specification, then the boot processor 21 would be called the "boot strap processor (BSP)", and the clone processors 22, 23 would be called "application processors (AP)." In the example of FIG. 1, the processors 22, 23 are called "clone" processors because when they are up and running respective invocations of a shared program, they perform substantially the same function as the boot processor 21. They may perform different functions for the shared program when is desirable to have a single invocation of a program control a low-level function, such as a device driver for an input/output device that is to be shared among the processors. On the other hand, for fault tolerance and simplified failure recovery, it would be desirable for each processor to have its own dedicated I/O devices and device drivers. Due to these competing considerations, it is advantageous for some I/O devices such as a keyboard and a super VGA display to be shared among the multi-processors, and others such as network and storage interfaces to be dedicated to respective processors.

In the multiprocessor system of FIG. 1, the boot processor is coupled to the clone processors 22, 23 by a memory and control bus 24. The memory and control bus 24 is coupled to a shared memory 25, a programmable interrupt controller, and an input-output interface 27. The programmable interrupt controller 26 and the input-output interface 27 typically are incorporated on a single integrated circuit chip such as an Intel 82489DX Advanced Programmable Interrupt Controller, although the programmable interrupt controller 26 and the input-output interface 27 could be integrated on one or more of the chips of the boot processor 21 or the clone processors 22, 23. The input-output interface 27 supports ISA devices 28 and PCI devices 29. The ISA devices 28 and the PCI devices 29 could include one or more network interface cards, SCSI interface cards, fibre-channel interface cards, floppy disk drives, hard disk drives, CD ROM drives, display controllers, and keyboard interfaces.

After the multiprocessor system of FIG. 1 has been initialized, the boot processor 21 and the clone processors 22, 23 execute a shared program 31. In this example, each of the processors 21, 22, 23 runs a separate respective invocation of the shared program 31. Each invocation produces a different set of data during read-write access to the shared memory 25. To avoid memory access conflict among the processors 21, 22, 23 to the respective data produced by each invocation of the shared program 31, each of the processors has a respective address translator 32, 33, 34 that permits the respective processors to execute the same read-write access instructions in the shared program for accessing respective different regions of the shared memory. The address translator as found in the Pentium® processor will be further described below with reference to FIG. 5. The address translator in each case includes respective page translation logic 35, 36, 37. The page translation logic keeps track of pages of data or code that have been retrieved from disk storage and written into allocated regions of the shared memory, and translates a virtual address of the data or code in the disk storage to a physical address where the same data or code has been written in to the shared memory. The page translation will be further described below with reference to FIG. 7.

The address translator 32, 33, 34 in each of the processors accesses a respective set of translation tables 38, 39, 40 in the shared memory 25. These translation tables are programmed so that the processors share access to read-only instructions and read-only data in the shared program 31, and the processors perform read-write access to respective private regions of the shared memory. In particular, the translation tables 38, 39, 40 are programmed so that each of the processors 21, 22, 23 can execute the same set of read-write instructions in the shared program 31 yet the read-write instructions when executed in each processor will read or write to a different set of physical addresses for each processor in the shared memory 25. Therefore memory access conflict between the respective processors is avoided without the programming overhead or possible blocking associated with other techniques such as memory locks. As will be further described below with reference to FIGS. 6, 8 and 9, the translation tables, for example, are descriptor tables, page directories, or page tables.

One application for the multiprocessor system of FIG. 1 is a data mover or stream server computer for a network or video file server as described, for example, in Tzelnic et U.S. Pat. No. 5,944,789, incorporated herein by reference, or Duso et al., U.S. Pat. No. 5,892,915, incorporated herein by reference. Network and video file servers as described in the above two patents have used uniprocessor data mover computers having a memory layout as shown in FIG. 2. This memory layout includes free space, ROM BIOS, DART code, DART data, a symbol table, and free space. The DART code is the code of the data mover program, which is executed to move data between storage and a network client. The DART code includes low-level Unix operating system routines for memory management and input-output operations, and higher-level routines for moving the data between storage and a network client. The higher-level routines are written in the C++ language and complied and linked with C++ library routines and the low-level operating system routines. The symbol table is generated during the compilation and linking process. The symbol table is accessible during a crash dump for debugging purposes.

In order to permit each data mover computer to service a larger number of network clients, the uniprocessor circuit board in the data mover computer is replaced with a multiprocessor circuit board having the architecture of FIG. 1. In the case of a multiprocessor system having a single clone processor in addition to the boot processor, the physical layout for shared memory is shown in FIG. 3. This physical layout, for example, is also the layout as seen by the boot processor. The physical layout for the shared memory as shown in FIG. 3 differs from the prior art layout of FIG. 2 primarily by including memory regions for a boot and paging program 41, boot free space 42 used by the boot and paging program 41, boot data 43 that is accessed or generated by the boot processor after initialization during the execution of the DART code, boot free space 44 available for storing additional boot data during execution of the DART code by the boot processor, clone data 45 accessed or produced by a clone processor, clone free space 46 for allocation to additional clone data produced by the clone processor, and a shared data area 50 for shared read-write access by the boot processor and the clone processor. The shared data area 50, for example, is used for inter-processor communication. If additional clone processors would be used in the system, then the memory layout of FIG. 3 would include a respective clone data region and a clone free space region for each of the clone processors in the system.

Although each clone processor shares the same memory with the boot processor, the memory layout as seen by a clone processor is different from the physical layout and different from the memory layout as seen by the boot processor because the clone processor performs address translation that is different from address translation performed by the boot processor. This address translation has the effect of switching the clone data region 45 with the boot data region 43 so that the memory map includes clone data 47 at the previous location of the boot data 43, and boot data 48 at the previous location of the clone data 45. In the example of FIGS. 3 and 4, the clone data and the boot data are aligned on 4-megabyte boundaries so that the switch in the address translation can be done simply through an exchange of two page directory entries, as further described below with reference to FIG. 8. Moreover, in each case, the data for a particular processor, either boot or clone, is accessed by program instructions addressing the uppermost region 45 or 48 of memory. Therefore, each processor can execute the same program instructions of the shared program.

FIG. 5 shows address translation circuitry in the Pentium® processor. Memory access instructions specify a logical address including a 16-bit selector and a 32-bit offset. The selector addresses a descriptor table 51, which is either a global descriptor table (GDT) or, in the case of the execution of a task during multi-tasking, a local descriptor table (LDT) for the task. An adder 52 adds the 32-bit offset to the contents of the addressed entry of the descriptor table 51 to produce a 32-bit linear address. If data or instructions at the 32-bit linear address have been written into memory, then page translation circuitry 53 converts the 32-bit linear address to the corresponding physical address in memory; otherwise, the page translation circuitry produces an exception. Depending on the present addressing mode of the processor, a multiplexer 54 selects either the offset for a 32-bit addressing mode, or the 32-bit linear address if paging is disabled, or the address produced by the page translation circuitry 53 if paging is enabled. The address selected by the multiplexer 54 is a 32-bit physical address that accesses an instruction or data cache (not shown) in the Pentium® processor. If the instruction or data cache does not presently contain the addressed instruction or data, then the processor asserts the 32-bit physical address upon the memory and control bus 24.

Figure 6:
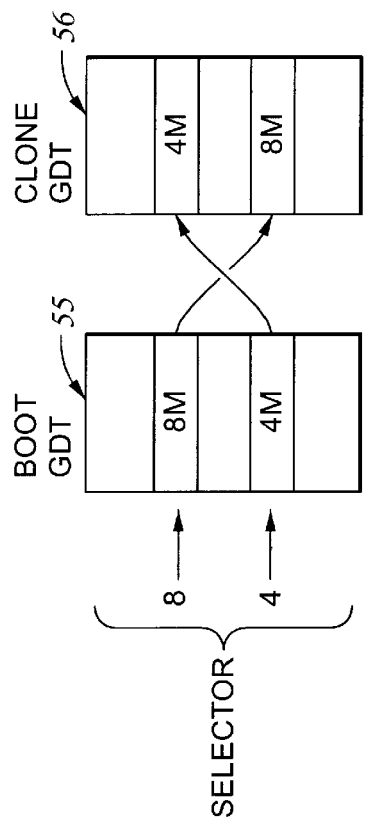
FIG. 6 is a block diagram showing how entries in a global descriptor table (GDT) can be exchanged in order to perform a re-mapping of a pair of read-write memory segments.

FIG. 6 is a block diagram showing how two entries in the global descriptor table (GDT) could be exchanged in order to for the mapping of two read-write memory segments to appear different between the boot processor and a clone processor. In this example, the granularity of the descriptor segments is set to 1 megabyte, and the boot processor translation tables include a boot GDT 55 that is programmed so that each entry in the table has a value of 1 M (where M is two raised to the $20^{th}$ power) times the index of the entry. For example, as shown in FIG. 6, a selector value of 4 addresses an entry containing a value of 4 M, and a selector value of 8 addresses an entry containing a value of 8 M. Therefore the physical layout of the shared memory will be the same as the memory layout as seen by the boot processor. The clone processor translation tables include a clone GDT 56 that is similar to the boot GDT except that the contents of the $4^{th}$ entry have been exchanged with the contents of the $8^{th}$ entry. Therefore, for the $4^{th}$ and $8^{th}$ memory segments, the physical layout of the shared memory will be different from the memory layout as seen by the clone processor; in particular, the $4^{th}$ and $8^{th}$ memory segments will appear to be interchanged. With reference to FIGS. 3 and 4, for example, the boot data 43 is located in the $4^{th}$ memory segment, and the clone data 45 is located in the $8^{th}$ memory segment.

Unix operating systems generally do not support changes in memory segmentation, but they do support paging. Paging provides a second level of address translation. When the shared program is based on an operating system that supports paging but does not support changes in memory segmentation, the page translation mechanism can be used to make the layout of shared memory as seen by the clone processors different from the layout of the shared memory as seen by the boot processor.

FIG. 7 further shows the page translation circuitry of the Pentium® processor. The 32-bit linear address is subdivided into a ten-bit directory field, a ten-bit table field, and a twelve-bit offset field. The directory field indexes a 1 K ×32 page directory 73. If the indexed entry of the page directory is invalid, then the page translation circuitry produces an exception. Otherwise, the content of the indexed entry provides a base address for locating a page table 74 in memory. The table field indexes the page table 74. If the indexed entry of the page table is invalid, then the page translation circuitry produces an exception. Otherwise, the content of the indexed entry of the page table provides a base address that is received by an adder 75. The adder 75 adds the base address to the offset field to produce the 32-bit physical address.

FIG. 8 is a block diagram showing how two entries in the page directory could be exchanged in order for the mapping of two 4-megabyte memory regions to appear different to the boot processor and a clone processor. In a boot page directory 76, a directory value of 4 indexes a directory address containing the base address of a first page table (TABLE X), and a directory value of 8 addresses an entry containing a base address of a second page table (TABLE Y). TABLE X is programmed to provide the physical addresses of the boot data region (43 in FIG. 3), and TABLE Y is programmed to provide the physical addresses of the clone data region (45 in FIG. 3). Therefore the physical layout of the shared memory will be the same as the memory layout as seen by the boot processor. The clone processor page directory 77 is produced by copying the boot processor page directory and then interchanging the two entries having the respective indices of 4 and 8. Therefore, the physical layout of the shared memory will be different from the memory layout as seen by the clone processor; in particular, the clone data region and the boot data region will appear to be interchanged.

FIG. 9 is a block diagram showing how two entries in a page table could be exchanged in order to perform a re-mapping of two 4-kilobyte pages of memory. An original page table 78 has a first entry containing a base address of a first page of memory (PAGE X) and a second entry containing a base address of a second page of memory (PAGE Y). The original page table 78 is modified by exchanging the contents of the two entries to produce a modified page table 79. In this case, the contents of the two pages will appear to have been exchanged in memory.

Figure 10:
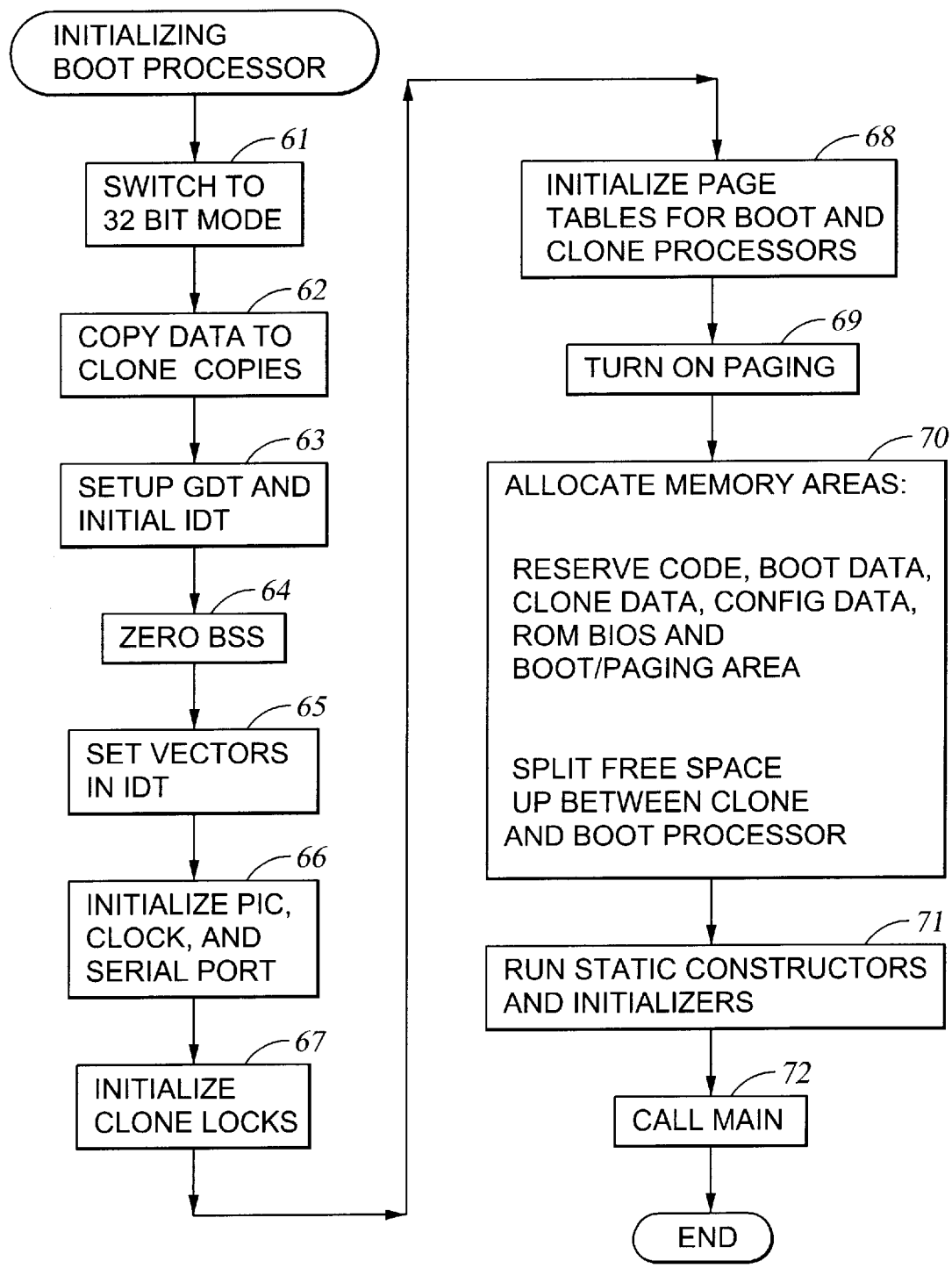
FIG. 10 is a flowchart of a routine for initializing the boot processor.

FIG. 10 shows a flowchart of a routine executed by the boot processor when initializing the multiprocessor system of FIG. 1. In a first step 61, the boot processor switches to the 32 bit-addressing mode, which disables page translation. Then in step 62 the boot processor copies data from the boot data region (43 in FIG. 3) to the clone data regions (e.g., 45 in FIG. 3). Then in step 63 the boot processor sets up its global descriptor table (GDT) and initial interrupt descriptor table (IDT). In step 64 the boot processor zeros the Unix BSS base memory region. Then in step 65 the boot processor sets vectors in its interrupt descriptor table (IDT). Then in step 66 the boot processor initializes its program instruction counter (PIC), and the clock and the serial port on the multiprocessor system circuit board. Then in step 67 the boot processor initializes locks on the clone processors. These locks are multiprocessor locks in the shared data area (50 in FIG. 3) of the shared memory, and the locks are used for coordinating communication between the processors via the shared data area. In step 68 the boot processor initializes a page directory and a set of page tables for the boot processor, and initializes a page directory and set of page tables for the clone processors, as described above with reference to FIG. 8. Then in step 69 the boot processor turns on its page translation circuitry. In step 70 the boot processor allocates various memory areas, including reserved code, boot data, clone data, configuration data, ROM BIOS and boot or paging areas. The configuration data determines what ISA or PCI devices are used by each processor. The boot processor also splits the free space up between the clone and boot processor. Then in step 71 the boot processor runs static constructors and initializers. These static constructors and initializers allocate and initialize data structures in the DART application program. The constructors are C++ procedures associated with C++ class data structures. A list of static constructors is produced when the C++ code is compiled. The initializers are similar procedures associated with data structures set up by assembly language programming. These data structures include operating system locks known as MUTEXes. Then in step 72 the boot processor calls the main routine of the DART program, and the initialization routine is finished.

Figure 11:
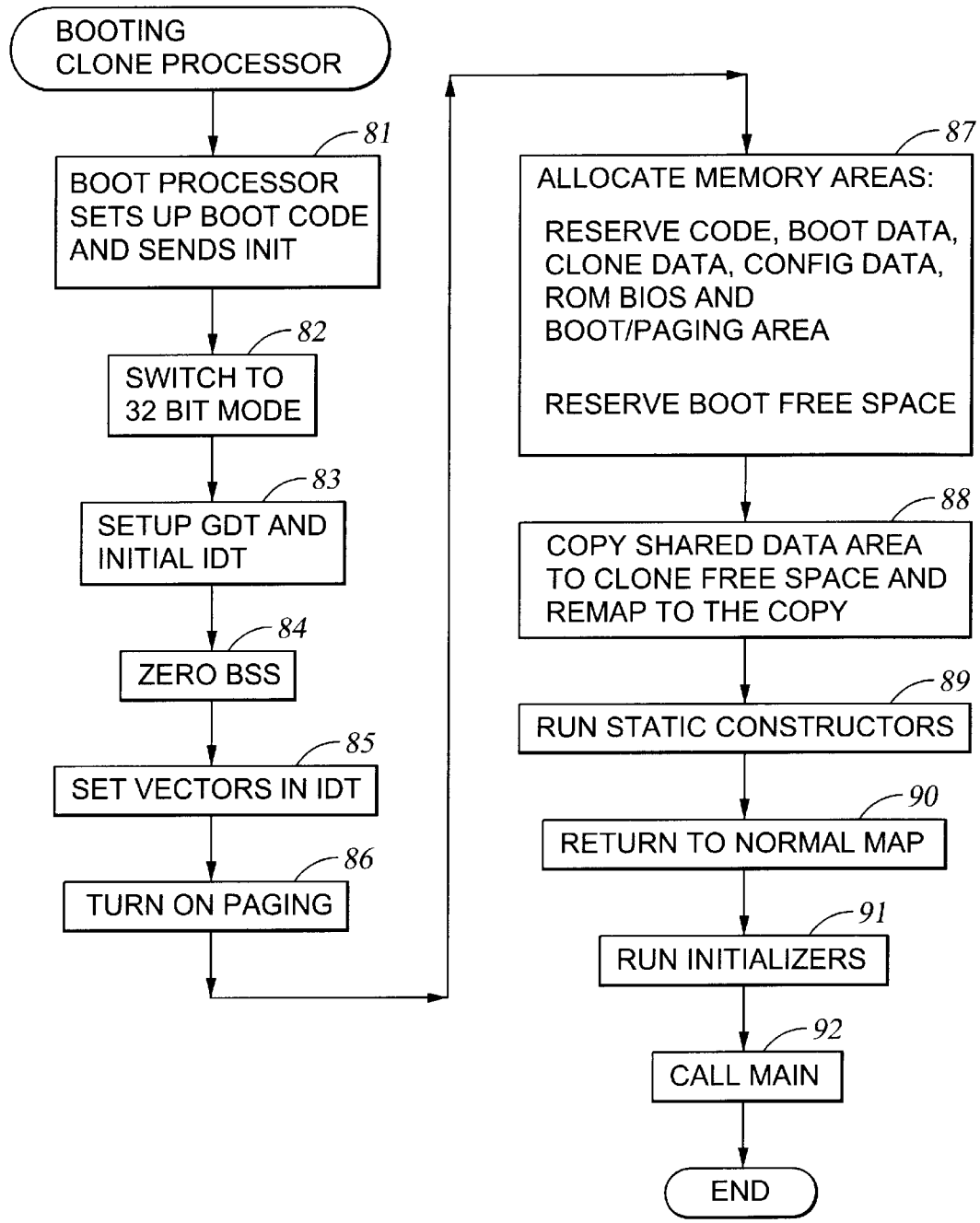
FIG. 11 is a flowchart of a routine for booting a clone processor in the multiprocessor system of FIG. 1.

With reference to FIG. 11, there is shown a flowchart of the procedure used for booting a clone processor. The clone processor executes boot code that is set up by the boot processor in step 81. Once the boot processor has set up the boot code for the clone processor, the boot processor sends an initialization signal to the clone processor, causing the clone processor to begin executing the boot code. In step 82, the boot code is executed by the clone processor to switch to the 32 bit-addressing mode, which bypassing the page translation circuitry. Then in step 83 the clone processor sets up its global descriptor table (GDT) and an initial interrupt descriptor table (IDT). Then in step 84 the clone processor zeros the Unix BSS base memory region.

In step 85 the clone processor sets vectors in its interrupt descriptor table. In step 86 the clone processor turns on the page translation circuitry. In step 87 the clone processor allocates a number of memory areas, including reserve code, boot data, clone data, configuration data, ROM BIOS, and a boot and paging area. The clone processor also reserves boot free space.

As noted above, there are some functions that are not replicated by each processor when each processor is concurrently invoking the shared program. These functions include inter-processor communication and certain device drivers for input-output devices that serviced by an assigned one of the processors. These functions may use the shared read-write data area (50 in FIG. 30) of the shared memory. It is desirable to include the code for these functions in the shared program (such as the shared DART code in FIG. 3) even though only one of the processors, such as the boot processor, will have primary responsibility for initializing these functions. This may cause a peculiar problem that the shared program code will have some static constructors that should change the content of the shared read-write data area (50 in FIG. 30) only once during initialization by the boot processor, and not during initialization or re-boot by a clone processor. In the clone initialization procedure of FIG. 11, this peculiar problem is solved by running the static constructors on a working copy of the shared read-write data that should not have its content changed in the shared read-write data area. In particular, in step 88, the clone processor copies data from the shared read-write data area (50 in FIG. 3) to free memory, such as in the clone free space 46, and remaps to the copy. The remapping is done, for example, by changing or exchanging the contents of one or more pairs of entries in the clone processor's set of page tables, as described above with reference to FIG. 9. One of the entries in the pair is the base address of a set of pages for the shared read-write data area (50 in FIG. 3) and the other of the entries in the pair is the base address of a set of pages of free memory for the working copy of the data. In step 89, the clone processor runs static constructors that use the working copy of the data. Then in step 90, the clone processor returns to a normal memory mapping; i.e., the mapping prior to the remapping in step 88. Once the running of the static constructors is finished, the clone processor does not need the working copy because the clone processor can access the original instead. In step 91, the clone processor runs initializers to prepare for the calling of the main program in step 92. Then the booting of the clone processor is finished.

In view of the above, there has been described a method of sharing memory in a multiprocessor system including a cloning of code and data in order to permit each processor to run concurrently a separate invocation of a program. Each processor uses the same address translation for shared access to the program code in a shared memory, and a different address translation for access to a respective private read-write data region in the shared memory. Initialization of a private data region is performed by copying data from a shared read-only memory region, such as the program region, to the private data region. Some static constructors may access a shared read-write data region that should not be reinitialized by the clone processor. In this case, a working copy of a data region is made, the address translation is remapped for access to the working copy, the static constructors are run, and then the mapping is returned for normal access to the shared data.

What is claimed is:

1. In a multiprocessor system including at least a first processor, a second processor, and a memory linked to each of the processors for read and write access to the memory by each of the processors, each of the processors having an address translator for translating logical addresses specified by program instructions to corresponding physical addresses for addressing the memory, the address translator of the first processor accessing a first translation table, and the address translator of the second processor accessing a second translation table, a method comprising:

(a) allocating at least three non-overlapping regions in physical address space of the memory including a program region containing a program, a first data region for private read-write access by the first processor, and a second data region for private read-write access by the second processor;

(b) initializing a first copy of program data in the first data region of the memory, and initializing a second copy of the program data in the second data region of the memory;

(c) setting entries in the first translation table and in the second translation table so that each of the processors translates logical instruction addresses of program instructions of the program in the memory to physical addresses of the program instructions in the program region of the memory so that the processors share read-only access to the program in the memory during concurrent invocations of the program in the memory, so that the first processor translates logical data addresses specified by read-write access instructions in the program to physical addresses in the first data region of the memory, and so that the second processor translates the logical data addresses specified by the read-write access instructions in the program to physical addresses in the second data region of the memory; and (d) each of the processors running concurrently a separate invocation of the program in the program region of the memory, which includes copying the first translation table to produce a copy of the first translation table, and exchanging contents of at least one pair of entries in the copy of the first translation table to produce the second translation table.

2. The method as claimed in claim 1, wherein the first translation table is a first global descriptor table, and the second translation table is a second global descriptor table, and for a selector value in the logical data addresses specified by the read-write access instructions in the program, the first global descriptor table has a first entry indexed by the selector value and the second global descriptor table has a second entry indexed by the selector value, and the method includes setting content of the second entry to be different from content of the first entry, the content of the first entry specifying a first segment of memory containing at least a portion of the first data region, and the content of the second entry specifying a second segment of memory containing at least a portion of the second data region.

3. The method as claimed in claim 1, wherein the first translation table is a first page directory and the second translation table is a second page directory, and the method includes setting the first page directory to reference at least a first page table for translating the logical data addresses specified by the read-write access instructions in the program to the physical addresses in the first data region of the memory, and setting the second page directory to reference at least a second page table for translating the logical data addresses specified by the read-write access instructions in the program to physical addresses in the second data region of the memory.

4. The method as claimed in claim 1, wherein the first translation table is a first page table and the second translation table is a second page table, and the method includes setting the first page table to reference at least a first page of physical addresses in the first data region of the memory, and setting the second page table to reference at least a second page of physical addresses in the second data region of the memory.

5. In a multiprocessor system including at least a first processor, a second processor, and a memory linked to each of the processors for read and write access to the memory by each of the processors, each of the processors having an address translator for translating logical addresses specified by program instructions to corresponding physical addresses for addressing the memory, the address translator of the first processor accessing a first translation table, and the address translator of the second processor accessing a second translation table, a method comprising:

(a) allocating at least three non-overlapping regions in physical address space of the memory including a program region containing a program, a first data region for private read-write access by the first processor, and a second data region for private read-write access by the second processor:

(b) initializing a first copy of program data in the first data region of the memory, and initializing a second copy of the program data in the second data region of the memory;

(c) setting entries in the first translation table and in the second translation table so that each of the processors translates logical instruction addresses of program instructions of the program in the memory to physical addresses of the program instructions in the program region of the memory so that the processors share read-only access to the program in the memory during concurrent invocations of the program in the memory, so that the first processor translates logical data addresses specified by read-write access instructions in the program to physical addresses in the first data region of the memory, and so that the second processor translates the logical data addresses specified by the read-write access instructions in the program to physical addresses in the second data region of the memory; and (d) each of the processors running concurrently a separate invocation of the program in the program region of the memory,
which includes copying shared data from a shared data area of the memory to a free area of the memory, the shared data area of the memory being referenced by static constructors, changing the second translation table from a first state to a second state so that the static constructors reference the copy of the shared data, running the static constructors so that the static constructors access the copy of the shared data, and then returning the second translation table to the first state.

6. The method as claimed in claim 5, wherein the shared data area of the memory is at least one page of the memory, and the second translation table is a page table that is changed from the first state to the second state by changing at least one entry in the page table, said at least one entry in the page table in the first state referencing said at least one page of the memory in the shared data area, and said at least one entry in the page table in the second state referencing at least one page of the memory in the free area of the memory.

7. The method as claimed in claim 5, wherein the first processor initializes the shared data area of the memory, and then the second processor copies the shared data from the shared data area of the memory to the free area of the memory, the second processor changes the second translation table from the first state to the second state so that the static constructors reference the copy of the shared data, the second processor runs the static constructors so that the static constructors access the copy of the shared data; and then the second processor returns the second translation table to the first state.

8. In a multiprocessor system including at least a first processor, a second processor, and a memory linked to each of the processors for read and write access to the memory by each of the processors, each of the processors having an address translator for translating logical addresses specified by program instructions to corresponding physical addresses for addressing the memory, a method of accessing the memory so that each of the processors may run concurrently a separate invocation of a program in a program region of the memory while accessing a shared data area in the memory, the method comprising:

copying shared data from the shared data area of the memory to a free area of the memory, the shared data area of the memory being referenced by constructors;

changing address translation of the second processor from a first state to a second state so that the constructors reference the copy of the shared data, running the constructors so that the constructors access the copy of the shared data; and then returning the address translation of the second processor to the first state.

9. The method as claimed in claim 8, wherein the shared data area of the memory is at least one page of the memory, and the address translation of the second processor is changed from the first state to the second state by changing at least one entry in a page table accessed by the address translator of the second processor, said at least one entry in the page table in the first state referencing said at least one page of the memory in the shared data area, and said at least one entry in the page table in the second state referencing at least one page of the memory in the free area of the memory.

10. The method as claimed in claim 8, wherein the first processor initializes the shared data area of the memory, and then the second processor copies the shared data from the shared data area of the memory to the free area of the memory, the second processor changes the address translation of the second processor from the first state to the second state so that the constructors reference the copy of the shared data, the second processor runs the constructors so that the constructors access the copy of the shared data; and then the second processor returns the address translation of the second processor to the first state.

11. The method as claimed in claim 10, which further includes each of the processors concurrently running a separate invocation of a program in a program region of the memory while accessing the shared data area in the memory, the constructors being static constructors of the program.

12. A multiprocessor system comprising at least a first processor, a second processor, and a memory linked to each of the processors for read and write access to the memory by each of the processors, each of the processors having an address translator for translating logical addresses specified by program instructions to corresponding physical addresses for addressing the memory, the address translator of the first processor being operative for accessing a first translation table, and the address translator of the second processor being operative for accessing a second translation table, the processors being programmed for:

(a) allocating at least three non-overlapping regions in physical address space of the memory including a program region containing a program, a first data region for private read-write access by the first processor, and a second data region for private read-write access by the second processor;

(b) initializing a first copy of program data in the first data region of the memory, and initializing a second copy of the program data in the second data region of the memory;

(c) setting entries in the first translation table and in the second translation table so that each of the processors translates logical instruction addresses of program instructions of the program in the memory to physical addresses of the program instructions in the program region of the memory so that the processors share read-only access to the program in the memory during concurrent invocations of the program in the memory, so that the first processor translates logical data addresses specified by read-write access instructions in the program to physical addresses in the first data region of the memory, and so that the second processor translates the logical data addresses specified by the read-write access instructions in the program to physical addresses in the second data region of the memory; and (d) each of the processors running concurrently a separate invocation of the program in the program region of the memory;

wherein at least one of the processors is programmed for copying the first translation table to produce a copy of the first translation table, and exchanging contents of at least one pair of entries in the copy of the first translation table to produce the second translation table.

13. The multiprocessor system as claimed in claim 12, wherein the first translation table is a first global descriptor table, and the second translation table is a second global descriptor table, and for a selector value in the logical data addresses specified by the read-write access instructions in the program, the first global descriptor table has a first entry indexed by the selector value and the second global descriptor table has a second entry indexed by the selector value, content of the second entry is set to be different from content of the first entry, the content of the first entry specifying a first segment of memory containing at least a portion of the first data region, and content of the second entry is set to specify a second segment of memory containing at least a portion of the second data region.

14. The multiprocessor system as claimed in claim 12, wherein the first translation table is a first page directory and the second translation table is a second page directory, the first page directory references at least a first page table for translating logical data addresses specified by read-write access instructions in the program to physical addresses in the first data region of the memory, and the second page directory references at least a second page table for translating logical data addresses specified by read-write access instructions in the program to physical addresses in the second data region of the memory.

15. The multiprocessor system as claimed in claim 12, wherein the first translation table is a first page table and the second translation table is a second page table, the first page table references at least a first page of physical addresses in the first data region of the memory, and the second page table references at least a second page of physical addresses in the second data region of the memory.

16. A multiprocessor system comprising at least a first processor, a second processor, and a memory linked to each of the processors for read and write access to the memory by each of the processors, each of the processors having an address translator for translating logical addresses specified by program instructions to corresponding physical addresses for addressing the memory, the address translator of the first processor being operative for accessing a first translation table, and the address translator of the second processor being operative for accessing a second translation table, the processors being programmed for:

(a) allocating at least three non-overlapping regions in physical address space of the memory including a program region containing a program, a first data region for private read-write access by the first processor, and a second data region for private read-write access by the second processor;

(b) initializing a first copy of program data in the first data region of the memory, and initializing a second copy of the program data in the second data region of the memory;

(c) setting entries in the first translation table and in the second translation table so that each of the processors translates logical instruction addresses of program instructions of the program in the memory to physical addresses of the program instructions in the program region of the memory so that the processors share read-only access to the program in the memory during concurrent invocations of the program in the memory, so that the first processor translates logical data addresses specified by read-write access instructions in the program to physical addresses in the first data region of the memory, and so that the second processor translates the logical data addresses specified by the read-write access instructions in the program to physical addresses in the second data region of the memory; and (d) each of the processors running concurrently a separate invocation of the program in the program region of the memory;

wherein the second processor is programmed for copying shared data from a shared data area of the memory to a free area of the memory, the shared data area of the memory being referenced by static constructors, changing the second translation table from a first state to a second state so that the static constructors reference the copy of the shared data, running the static constructors so that the static constructors access the copy of the shared data, and then returning the second translation table to the first state.

17. The multiprocessor system as claimed in claim 16, wherein the shared data area of the memory is at least one page of the memory, and the second translation table is a page table and the page table in the second state differs from the page table in the first state by a change in at least one entry in the page table, said at least one entry in the page table in the first state referencing said at least one page of the memory in the shared data area, and said at least one entry in the page table in the second state referencing at least one page of the memory in the free area of the memory.

18. The multiprocessor system as claimed in claim 16, wherein the first processor is programmed for initializing the shared data area of the memory before the second processor copies the shared data from the shared data area of the memory to the free area of the memory.

19. A multiprocessor system comprising at least a first processor, a second processor, and a memory linked to each of the processors for read and write access to the memory by each of the processors, each of the processors having an address translator for translating logical addresses specified by program instructions to corresponding physical addresses for addressing the memory, each of the processors being programmed for concurrently running a separate invocation of a program in a program region of the memory and accessing a shared data area in the memory, the second processor further being programmed for:

copying shared data from the shared data area of the memory to a free area of the memory, the shared data area of the memory being referenced by constructors;

changing address translation of the second processor from a first state to a second state so that the constructors reference the copy of the shared data, running the constructors so that the constructors access the copy of the shared data; and then returning the address translation of the second processor to the first state.

20. The multiprocessor system as claimed in claim 19, wherein the shared data area of the memory is at least one page of the memory, and the second processor is programmed for changing the address translation of the second processor from the first state to the second state by changing at least one entry in a page table accessed by the address translator of the second processor, said at least one entry in the page table in the first state referencing said at least one page of the memory in the shared data area, and said at least one entry in the page table in the second state referencing at least one page of the memory in the free area of the memory.

21. The multiprocessor system as claimed in claim 19, wherein the first processor is programmed for initializing the shared data area of the memory before the second processor copies the shared data from the shared data area of the memory to the free area of the memory.

22. The multiprocessor system as claimed in claim 19, wherein the constructors are static constructors of the program.

23. In a multiprocessor system including at least a first processor, a second processor, and a memory linked to each of the processors for read and write access to the memory by each of the processors, each of the processors having an address translator for translating logical addresses specified by program instructions to corresponding physical addresses for addressing the memory, a method of accessing the memory so that each of the processors may run concurrently a separate invocation of a program in a program region of the memory while accessing a shared data area in the memory, the program having constructors that change the content of the shared read-write data area only once during a boot of the first processor, and not during a boot of the second processor, the method comprising:

during the boot of the first processor, the first processor initializing the shared data area of the memory by running the constructors; and during the boot of the second processor, the second processor copying shared data from the shared data area of the memory to a free area of the memory, the shared data area of the memory being referenced by the constructors, the second processor changing address translation of the second processor from a first state to a second state so that the constructors reference the copy of the shared data, and the second processor running the constructors so that the constructors access the copy of the shared data, and then the second processor returning the address translation of the second processor to the first state.

24. A multiprocessor system comprising at least a first processor, a second processor, and a memory linked to each of the processors for read and write access to the memory by each of the processors, each of the processors having an address translator for translating logical addresses specified by program instructions to corresponding physical addresses for addressing the memory, each of the processors being programmed for concurrently running a separate invocation of a program in a program region of the memory and accessing a shared data area in the memory, the program having constructors for changing the content of the shared read-write data area only once during a boot of the first processor, and not during a boot of the second processor, the second processor being programmed for executing the program during the boot of the second processor for:

copying shared data from the shared data area of the memory to a free area of the memory, the shared data area of the memory being referenced by the constructors;

changing address translation of the second processor from a first state to a second state so that the constructors reference the copy of the shared data;

running the constructors so that the constructors access the copy of the shared data; and then returning the address translation of the second processor to the first state.

* * * * *